United States Patent [19]

Marino

[11] 3,877,027

[45] Apr. 8, 1975

[54] DATA DEMODULATION EMPLOYING INTEGRATION TECHNIQUES

[75] Inventor: Peter T. Marino, Boulder, Colo.

[73] Assignee: International Business Machines Corporation, Armonk, N.Y.

[22] Filed: Jan. 23, 1974

[21] Appl. No.: 435,802

[52] U.S. Cl. ............ 340/347 DD; 329/50; 329/104; 308/110

[51] Int. Cl. ............................................ H03k 5/00

[58] Field of Search .......... 329/50, 104; 360/29, 26, 360/51, 41; 328/110, 127

[56] References Cited

UNITED STATES PATENTS

| | | | |
|---|---|---|---|
| 3,371,157 | 2/1968 | Bushway | 178/6.6 |
| 3,679,982 | 7/1972 | Limberg | 329/50 |
| 3,696,429 | 5/1971 | Tressa | 343/180 |
| 3,740,461 | 6/1973 | Harwood | 178/5.4 SD |
| 3,747,003 | 7/1973 | Siglow | 329/104 |
| 3,765,005 | 10/1973 | Cannon | 340/174.1 G |
| 3,775,557 | 11/1973 | Ishigaki et al. | 178/5.4 SD |
| 3,790,954 | 2/1974 | Devore et al. | 340/146.1 F |

*Primary Examiner*—Eugene G. Botz
*Assistant Examiner*—Vincent J. Sunderdick
*Attorney, Agent, or Firm*—Herbert F. Somermeyer

[57] ABSTRACT

Alternately cycled integrators alternately and successively drive first and second demodulator output circuits to supply data signals to first and second detecting latches, respectively, to convert received periodic digital signals to detected timed data signals. For high-frequency operation, the alternately cycled integrators are squelched in successive alternate time periods after a short predetermined squelch delay. The delay enables reliable sampling of the integrated signal amplitudes. A common data output circuit converts the detected timed data signals to NRZI, NRZ, or other suitable synchronized signal formats. Phase errors are also detected.

6 Claims, 7 Drawing Figures

DATA DEMODULATION EMPLOYING INTEGRATION TECHNIQUES

RELATED PATENTS AND APPLICATIONS

This application is an improvement over copending, commonly assigned application, Ser. No. 353,823, filed Apr. 23, 1973 now U.S. Pat. No. 3,818,501.

Thompson U.S. Pat. No. 3,217,183 and Vermeulen U.S. Pat. No. 3,548,327 disclose integration data bit detection apparatus.

BACKGROUND OF THE INVENTION

The present invention relates to detecting data from signals represented in diverse waveforms, particularly those waveforms associatable with magnetic recording and communication systems.

Detection of data represented by multidistinct state signals, by using integration techniques, provides noise immunity advantages, as well as sensitivity enhancement over detection schemes analyzing wavelengths. In a binary recording or communication system, the binary signal is limited to two distinct states for representing 1's or 0's. Such a representation is called "non-return to zero" (NRZ). An improved data representation scheme is so-called "NRZI" (nonreturn to zero, change on 1 and no change on 0). Other data manifestations using multidistinct state signals include phase-encoded (PE), double-frequency (DFE or FM), etc.

As data rates increase, there is a corresponding increase in the frequency components of the signal being detected, as well as a substantial decrease in the time a data detector has to reliably extract represented data signals from an incoming or received signal. As such data bit period decreases in duration, the detection period for such data also decreases; hence, for a given squelch or recovery time in an integration system, the percentage of the detection period used for squelching increases. Accordingly, it is highly desirable to use alternate cycle integration as set forth in the above-referenced co-pending application. However, at higher frequencies, because of the squelching at the end of each detection period, certain errors can occur if the squelch is applied to the integrated waveform prematurely as by different circuit delays. The sampling of the integrated value is delayed somewhat beyond the end of the detection period. Therefore, it is highly desirable that integration data detection systems be devised which obviate the squelch problem even inherent in alternate cycled integration.

Further, processing of the sampled integration signal requires extremely rapid logic and detection circuits. Accordingly, it is desired to maximize the frequency throughput of a detection apparatus while maintaining frequency requirements on the detecting and signal processing logic at a reasonable level.

SUMMARY OF THE INVENTION

It is an object of the present invention to provide an improved data detection scheme used with higher frequency digital data systems whichc enable usage of moderate frequency circuitry.

In accordance with the present invention, a signal processing apparatus has first and second signal processing channels which alternately and successively process a signal. Each of the signal processing channels includes a synchronous demodulator circuit, preferably in the form of an alternate cycle integrator (no limitation thereto intended). A demodulator output circuit responsive to the synchronous demodulator circuit indicates synchronously demodulated signals, and a memory or detecting latch circuit is responsive to the demodulator output circuit to momentarily memorize the indicated demodulated signals. Data output circuits are responsive to the detecting and memory latches to supply data output signals in a synchronous manner for indicating certain informational content of the received or input signal.

When the above invention employs alternate cycle integration, in accordance with another aspect of the present invention, sampling errors of the integrated values are minimized by delaying the squelch a relatively short period of time after the end of each detection period. The binary representation of the detected integrated value is maintained in one of the two above-mentioned memory circuits for use during a subsequent detection period. The latter arrangement is particularly useful in the detection of NRZI signals.

In a most preferred form of the invention, such squelch delay is provided by delaying the application of squelch to the alternate cycle integrators by the storage time of saturated transistor elements. Such squelch delay is preferably of a duration just slightly greater than that minimum time required for sampling an integrated value. In a present constructed form of the invention, the delay does not exceed 15 nanoseconds for a detection period of approximately 70–75 nanoseconds.

The foregoing and other objects, features, and advantages of the invention will become apparent from the following more particular description of the preferred embodiment, as illustrated in the accompanying drawing.

THE DRAWING

DETAILED DESCRIPTION

Referring now more particularly to the appended drawing, like numerals indicate like parts and structural features in the various diagrams.

Figure 1:
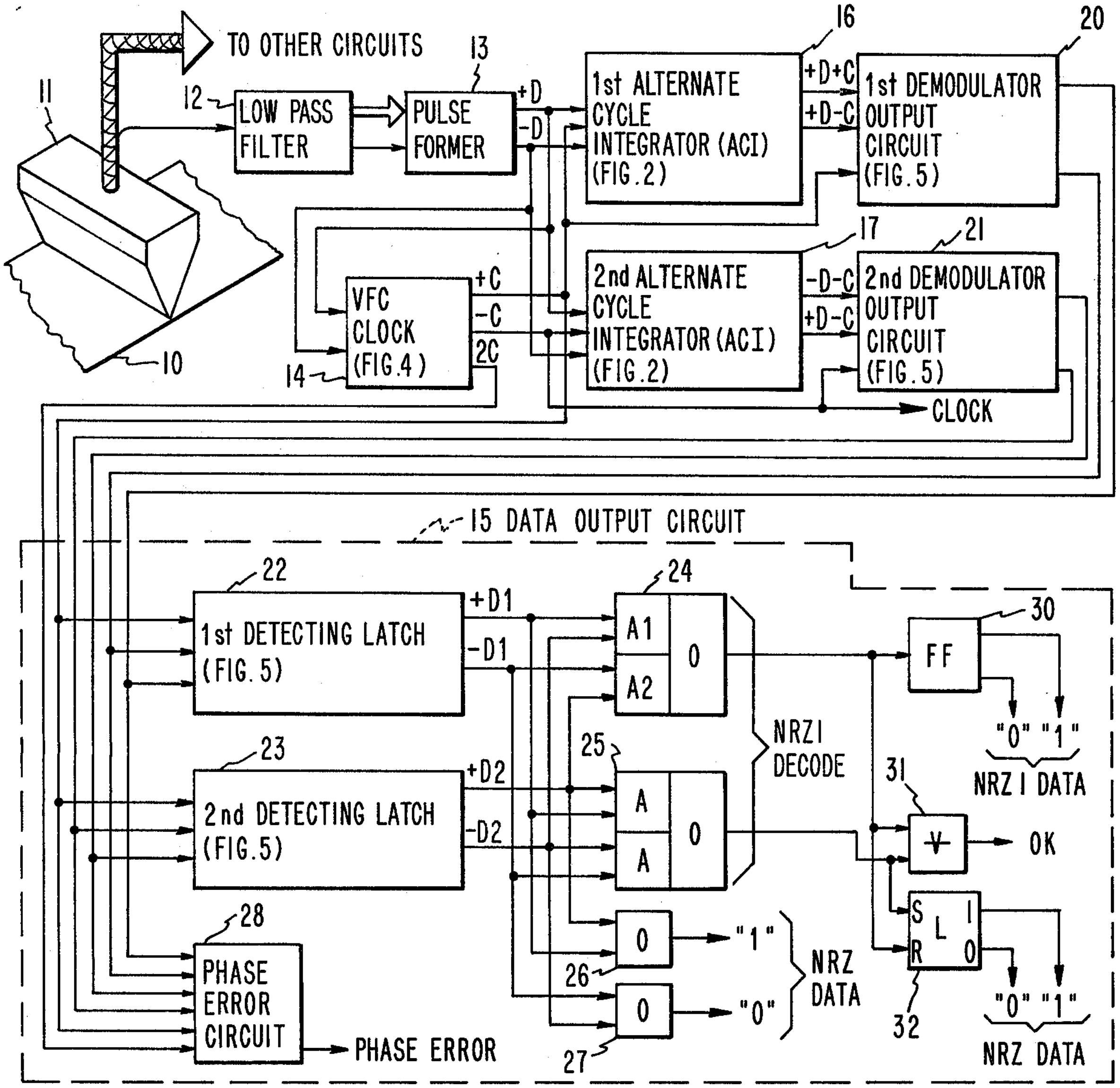
FIG. 1 is a simplified block diagram of an apparatus employing the present invention.

The present invention is particularly advantageously employed in the readback of digital signals from a magnetic medium 10 for supplying detected data signals to synchronously operated circuits, as is well known in the recording arts. A magnetic head 11 scans tracks on medium 10 to supply readback signals to lowpass filter 12, as well as other circuits or channels (not shown). In a multitrack environment, such as operation with a one-half inch magnetic tape medium, there can be nine circuits as shown in FIG. 1, one for each of the record tracks.

Figure 3:
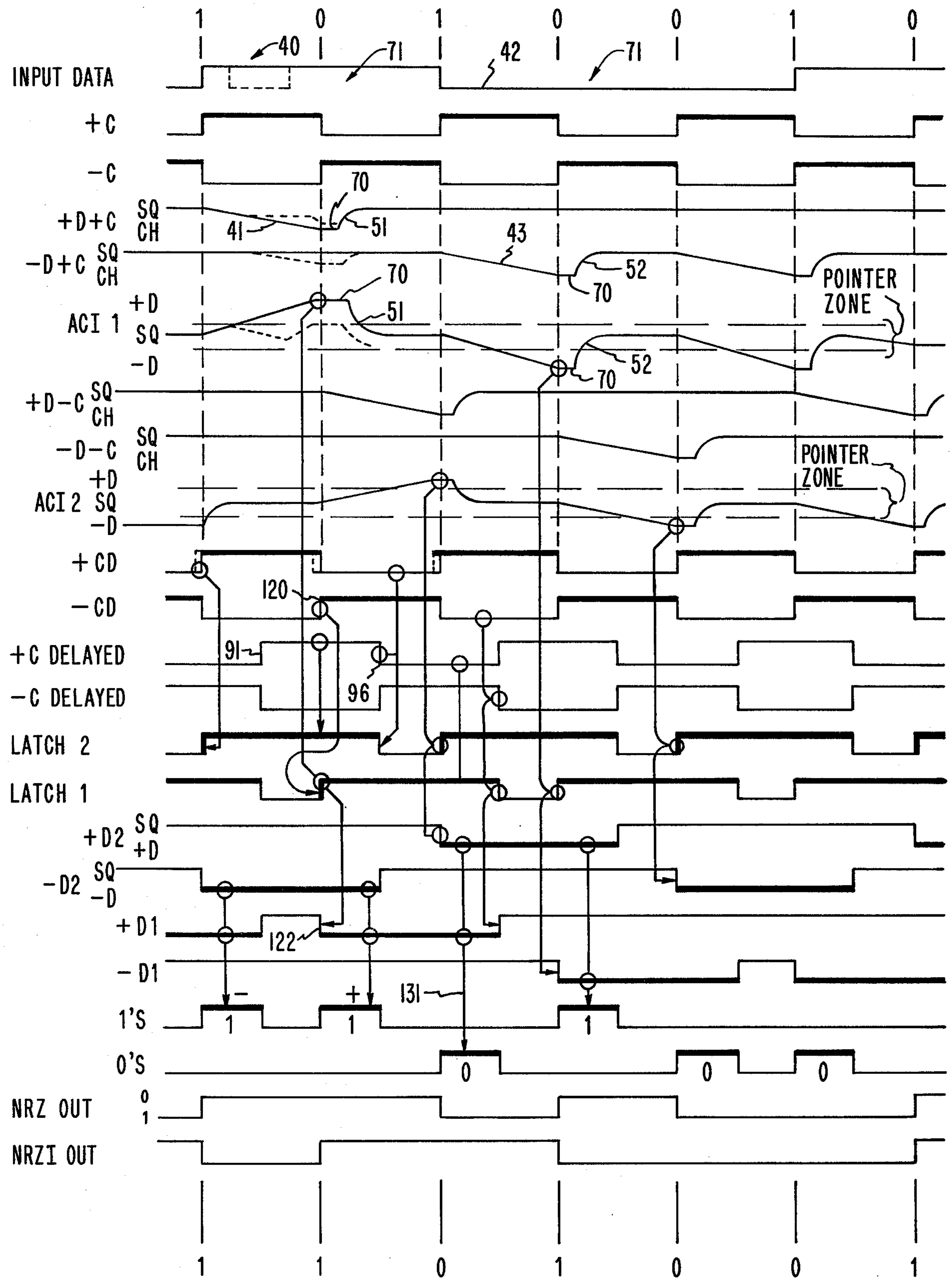
FIG. 3 is a set of signal waveforms used to illustrate the operation of the FIGS. 1 and 2 illustrated apparatus, both for data detection and phase error detection.

Low-pass filter 12 accentuates the low-frequency portion of the readback signal for enhancing data detection. In one constructed embodiment with which the present invention was employed, the bandpass of the readback signals was desired to be 3:1. Hence, the low-pass filter was designed to pass such a band from the baseband recorded signals on medium 10. The low-pass filter 12 also includes a phase splitter such that the readback signals are supplied in differential form to pulse former 13. The pulse former, in turn, differentially supplies amplitude limited input data signals hereinafter termed "+D and −D" signals. Such +D input data signals are shown in FIG. 3 as input data in the NRZI information representation. The −D signals have opposite polarity to the +D signals.

Figure 4:
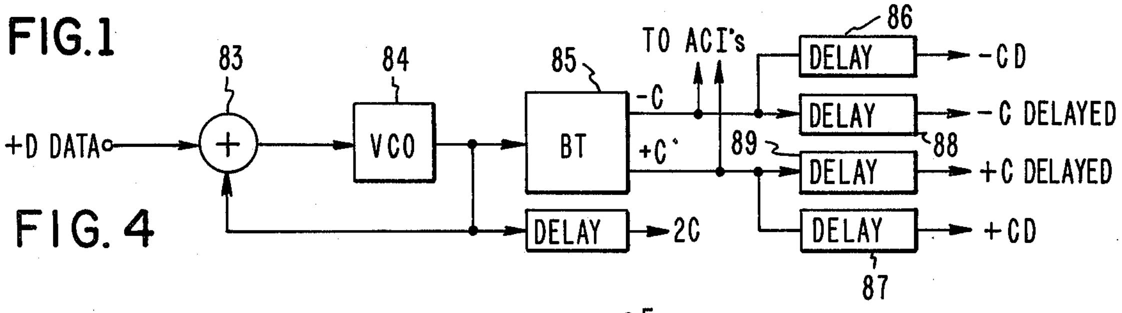
FIG. 4 is a simplified diagram of a clocking system usable with the FIG. 2 illustrated circuits.

Pulse former 13 supplies the +D and −D amplitude limited data signals to synchronize VFC (variable frequency clock) 14, such as well known in the art and as shown in simplified detail in FIG. 4. VFC 14 differentially supplies +C and −C timing or clock signals for enabling synchronous demodulation of the +D and −D signals for supplying timed and detected signals from data output circuit 15.

The +D and −D amplitude limited data signals are supplied to both first and second alternate cycled integrators (ACI) 16 17. These two circuits are synchronous demodulators, respectively in first and second signal processing channels which are alternately and successively actuated to detect data signals, respectively, by the +C and −C timing signals. The first data channel operates during a first set of detection periods represented in FIG. 3 by +C signal positive portions, while the second data channel operates on the input data signal during alternate successive periods identified by the positive portions of the −C clock signal. Such detection periods do not necessarily coincide with bit periods. In the illustrated input data signal, a bit period is between the carets intermediate the indicated data; while the detection periods are between bit period centers or cell centers on the record medium. The advantage of employing the present invention using detection periods shifted by 180° from the bit period will become apparent.

Each synchronous demodulator 16 and 17 supplies, respectively, +D+C, −D+C, and −D−C, +D−C integrated signals, respectively, to first and second demodulator output circuits 20 and 21. Circuits 20 and 21, respectively, compare under timing control of VFC 14, the integrated signals to indicate the integrated values, respectively, to first and second detecting latch circuits 22 and 23. Again, signals from VFC 14 time the operation of the first and second detecting latch circuits 22 and 23 such that the output signals of these latches represent both detected data with the VFC timing information. When NRZI signals are being detected, a pair of AO's 24 and 25 converts the +D1, −D1, +D2, and −D2 signals from the latches 22 and 23 into NRZI data, as will be more fully described later. If NRZ data is being detected (for example, PE data that has been initially demodulated from PE to NRZ form), a pair of OR circuits 26 and 27 combines the latch output signals to reconstitute NRZ data. Additionally, phase error circuit 28 responds to signals from both channels to indicate a phase error or phase okay to be used as taught by Hinz, Jr., in U.S. Pat. No. 3,639,900.

Data output circuit 15 includes binary trigger circuit 30 responsive to the 1 NRZI timed data signals from AO 24 to regenerate the NRZI data, as will be more fully described later. Additionally, Exclusive-OR circuit 31 responds to the output signals of AO 24 and AO 25 to indicate that the circuit is operating okay. That is, for any given detection period, there has to be either an NRZI 1 or an NRZI 0. Exclusive-OR 31 ensures that such detection has occurred even though the NRZI 0's are not used for data reconstruction.

Figure 2:
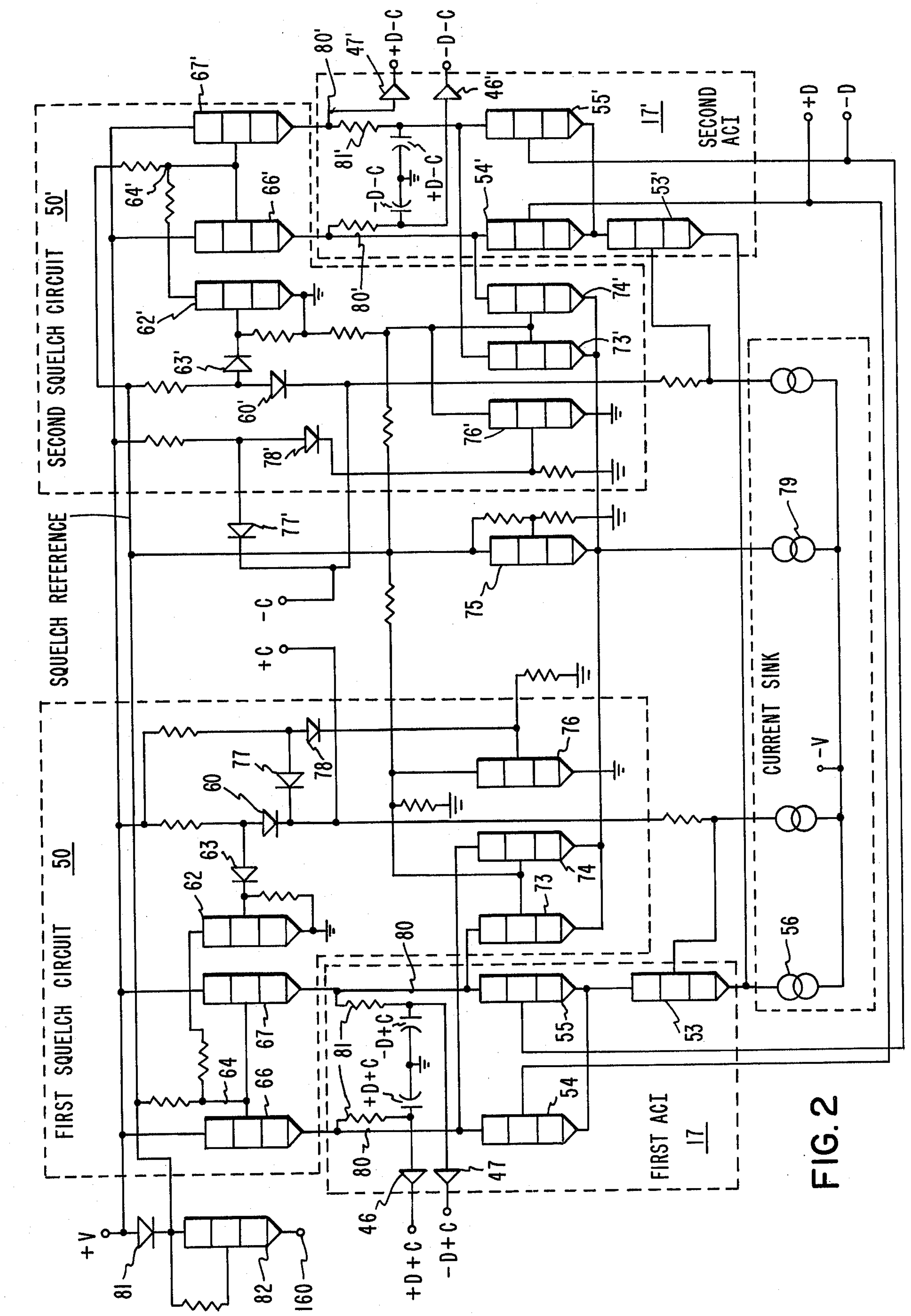
FIG. 2 is a circuit diagram showing the alternate cycle integrators used in the FIG. 1 illustrated embodiment and particularly illustrating squelch delay aspects of the present invention.

Referring next to FIG. 2, operation of the ACI's and squelch circuits is described in detail with reference to FIG. 3. ACI's for both channels 1 and 2 are identically constructed, as are the squelch circuits. In the description, the number primed applies to the second channel in the same manner as described for the first channel. The first ACI 16 has two integration capacitors respectively labeled +D+C and −D+C. The +D+C capacitor integrates plus data during + clock times. Referring to FIG. 3, + clock when positive and when the +D input data is positive as at 40 causes the +D+C capacitor to be negatively charged as at 41. When +C is positive, and −D is positive, the −D+C capacitor is similarly negatively charged. When +D is negative, as at 42, and charged as at 43, the differential integrated value of the first ACI taken between integration signal terminals 44 and 45 is shown in the signal waveform labeled ACI 1. Second ACI 17 operates in a similar manner for +D−C and −D−C capacitors. The integrated values in the respective capacitors are supplied through isolating amplifiers 46 and 47 to the demodulator output circuits shown in FIG. 5. The integration capacitors also are an analog memory for the integrated signals.

First squelch circuit 50 squelches the capacitors in first ACI in those bit periods when the second ACI is integrating signals. For example, in the +D+C signal waveform, the squelch is at 51 for the integrated value 41. In a similar manner, squelch at 52 squelches −D+C capacitor as integrated at 43. Squelch waveforms are also shown in the ACI 1 signal. The ACI 2 signal shows operation of AcI 17'.

The first ACI integrates data negatively whenever +C is positive. +C going positive disables squelch circuit 50. When +C is positive, current selector switch transistor element 53 connects the integrating transistors 54 and 55 to current source 56. When +C is negative, element 53 is current nonconductive to disconnect the ACI from source 56. During alternate cycles, the −C clock enables transistor element 53' of the second ACI such that current source 56 supplies integrating current for both ACI's in an alternate successive manner.

Transistor element 54 switches to current conduction by +D being positive. Transistor element 55 switches to current conduction in response to −D being positive, the latter corresponding to +D being negative. Hence, current source 56 supplies the integration current for both capacitors +D+C and −D+C in accordance with the synchronous relationship between the data signal and the VFC 14 supplied clock signal +C.

As +C goes negative, the squelch circuit 50, after a short squelch delay, rapidly returns the negatively charged value of +D+C and −D+C capacitors to a positive squelch reference potential as indicated by lines 51 and 52 of FIG. 3. When +C goes negative, transistor 53 becomes current nonconductive; hence, transistors 54 and 55 become inactive to hold the charge on the capacitors in the first ACI. +C being negative causes diode 60 to conduct current, thereby making node 61 relatively negative. This makes delay transistor 62 current nonconductive; that is, the circuit arrangement surrounding transistor element 62 delays the squelching of capacitors +D+C and −D+C by its saturation time. When +C was positive, node 61 correspondingly was positive. Thence, the positive voltage being fed through diode 63 makes transistor 62 current conductive to saturation. Such current conduction makes node 64 relatively negative, reverse biasing diode 65 to current nonconduction. Diode 65 is included in the circuit for temperature compensation. Node 64 being relatively negative makes the two matched squelch transistors 66 and 67 current nonconductive, hence, isolating squelch reference at node 68 from the two integration capacitors.

The term "matched transistor elements," as used in this specification, means that the electrical characteristics of such elements are almost identical. This is most advantageously achieved by simultaneously diffusing impurities for the transistor elements in the same area on a monolithic semiconductive chip such that the diffusions and the characteristics of the chip are as close as possible together. The entire FIG. 2 illustratd circuit can be achieved on one semiconductive chip, except for the capacitors, with matched transistors being located close together for achieving matching electrical characteristics.

Returning now to the operation of squelch circuit 50, transistor 62 being in current saturation cannot completely turn off until a predetermined time after +C has gone negative. The minority carriers in transistor element 62 continue to make node 64 relatively negative for a period of time equal to 5–15 nanoseconds. During this period of time, transistors 54 and 55 have switched off, resulting in a held voltage in ACI 1 signal as at 70. This squelch delay extends into the squelch period as at 71 following each detection period 40 and 42, for example. This action enables the ACI to be sampled without being affected by the squelch circuit 50. The above-described circuit using high-speed current switches in an advantageous "H" arrangement to provide an optimum alternately cycled integration arrangement.

The current sink portion of squelch circuit 50 includes current-switch transistor elements 73 and 74. Transistor element 76 controls the current conduction of elements 73, 74, and 75, plus 73′ and 74′. Also, transistor 76 is switched into and out of operation by diodes 77 and 78 in the same manner as diodes 60 and 63 control transistor 62. Transistor 76, during the integration (detection) period, is in current saturation and, therefore, affords the same delay as transistor 62. Thence, during the squelch time, transistors 73 and 74 connect the capacitor nodes 44 and 45 to current sink transistor 79 for supplying sufficient current for squelch level matching by transistors 66 and 67. Transistor 75 supplies current to sink 79 only when all transistor elements 73, 74, 73′ and 74′ are current nonconductive, i.e., during each and every squelch delay. Hence, transistor elements 73, 74, plus 75 and 73′, 74′ constitute a three-way current switch for switching sink 79 between two circuits having delayed current switching (squelch) delays.

The positive squelch reference potential is determined by transistors 66 and 67 via common diode 81 connected to the collector source potential. The squelch reference on node 68 is applied to both ACI's 17 an 17′. In addition, diode-connected transistor 82 supplies the squelch reference potential to the phase error circuit 28 as a phase shift reference, as will be more fully described later.

Squelch circuit 50 squelches integration capacitors +D+C, −D+C in a capacitive emitter-follower circuit configuration. To damp any oscillations, each capacitor has its signal terminal connected to the corresponding squelch-integrate nodes 80 via a damping resistor 81. The integrated signals in capacitors +D+C and −D+C are sensed by high-input impedance amplifiers or level shifters 46 and 47.

Referring next to FIG. 4, the VFC arrangement is shown in simplified form. Data received from the pulse former 13 can be either +D or −D. In FIG. 4 apparatus, +D is summed in summer 83 with the output of VFO 84 to control the frequency of operation thereof in a known manner. VCO 84 drives frequency dividing binary trigger (BT) 85 to produce the +C and −C clock signals, as shown in FIG. 3. BT 85 is a conventional binary trigger. In addition, four delay circuits delay the +C and −C signal as later described.

A 7–15 nanosecond delay is applied to the clock signals by circuits 86 and 87 to produce the ±CD signals used as hereinafter described. The ±C delayed are generated by delay circuits 88 and 89 for enabling NRZ-to-NRZI data conversion while using the detector latches thereby avoiding additional memory circuits in the detection apparatus. The 2C signal is twice the C pulse repetitive frequency out phase delayed a small amount.

Figures 5, 7:
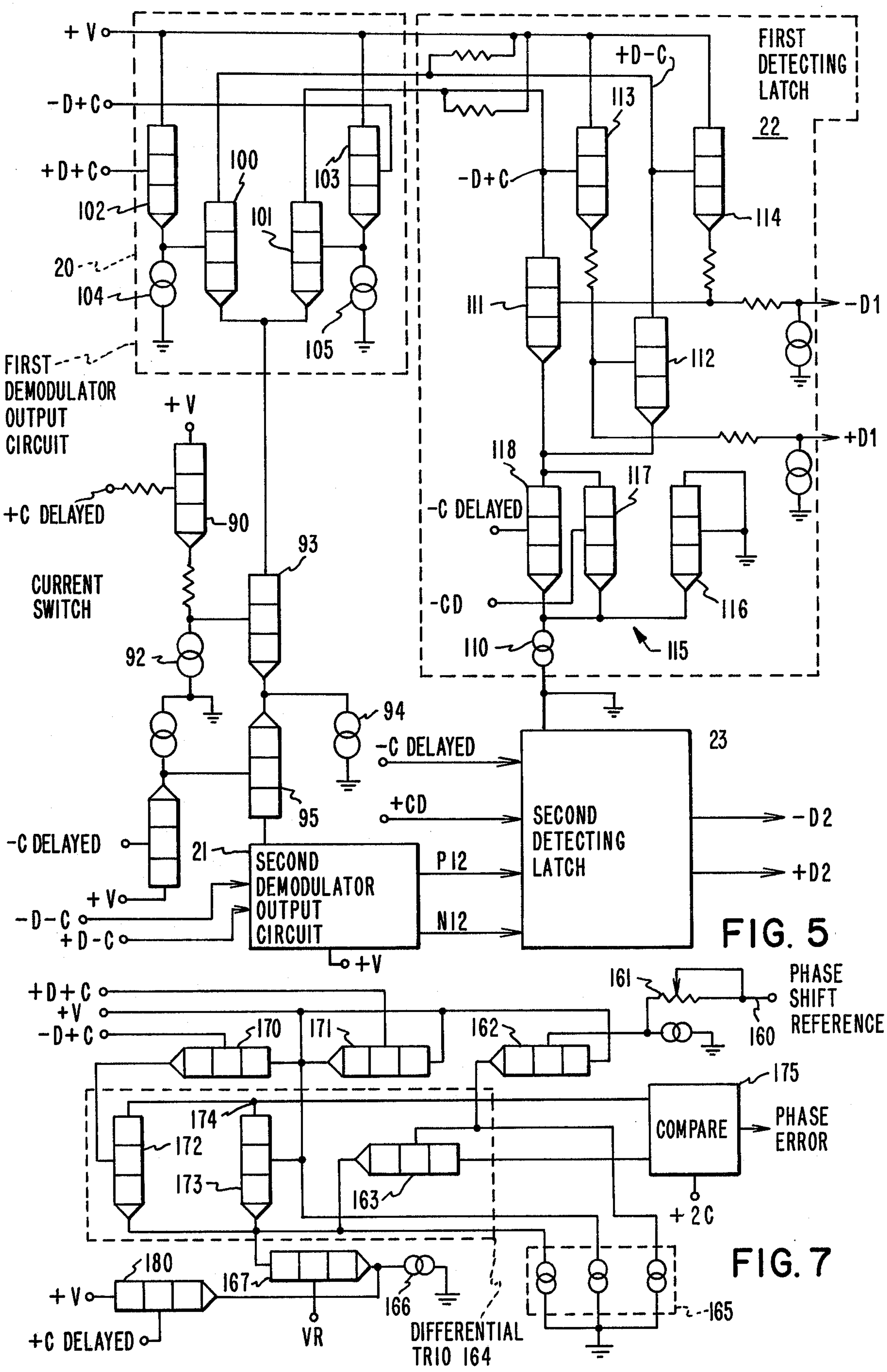
FIG. 5 is a schematic diagram of demodulator output circuits and detector latch circuits.
FIG. 7 is a circuit diagram of a phase error circuit particularly adapted to be used with the FIG. 2 illustrated circuit.

Referring next to FIG. 5, demodulator output circuits 20 and 21, plus the detecting latches 22 and 23, are described. The circuits employed in the first channel only are shown in detail; the second channel circuits 21 and 23 are shown in block form for simplifying the presentation. The first demodulator output circuit 20 responds to the +C delayed clock signal becoming positive to supply demodulator output indicating signals to the first detecting latch. In this regard, transistor element 90 responds to the +C delayed signal going positive as at 91 in the middle of the detection period to become current conductive. Current is supplied from +V to current source 92 making current switching transistor 93 current conductive. Transistor 93 is in a switching pair of transistors with current source 94. A second transistor 95 operates with second demodulator output circuit 21 in the same manner as described for and in alternate successive cycles with respect to transistor element 93. In any event, when +C delay becomes positive, first demodulator output circuit is activated. In a similar sense, when −C delayed signal becomes positive, as at 96, second demodulator output circuit 21 is activated.

First demodulator output circuit 20 consists of a pair of differentially coupled transistor elements 100 and 101 sharing current source 94 via switch transistor 93. +D+C integrated value goes to input transistor element 102, while the −D+C input signal goes to input transistor 103. These transistor elements are emitter coupled, respectively, to current sources 104 and 105 to respectively drive the base electrodes of differentially coupled transistors 100 and 101. The output circuit parameters are selected such that differential pair 100 and 101 acts as a current switching transistor; i.e., the elements are either in current saturation or current nonconductance. As such, a relatively good indication of the difference in integrated values goes to detecting latch 22.

Even though the demodulator output circuits supply indications of the integrated values for a substantial period prior to the end of the detection period, as at 40 and 42 for the first channel, first detecting latch 22 is not activated until immediately following the detection period. In this regard, first detecting latch 22 has current source 110 for activating the cross-coupled latch-forming transistor elements 111 and 112 in accordance with the inputs +D+C, −D+C applied, respectively, to transistor elements 113 and 114. When latch 22 is not activated by current source 110, the output signals on the −D1 and +D1 lines, respectively indicating detected −D and +D are in a positive state as best seen in FIG. 3. A negative signal on either of the lines indicates that timed detected data is being indicated. At all other times, no data is indicated. To switch latches 111 and 112 to the active condition, current switch 115 is activated to divert current for source or sink 110 from a supplied transistor 116 to one of the two latch current switching transistors 117 or 118. Immediately following the +C detection period, i.e., during the squelch delay 70, the −CD signal goes positive as at 120 activating latch switching transistor 117 to current conduction. This action switches transistor 116 to nonconductive state, thereby causing current to flow through transistors 111 and 112 making it active. As soon as current flows, it immediately (using regeneration principles of cross-coupled latches) switches to the state indicated by the first demodulator output circuit for the integrated values. Immediately, one of the two output lines −D1 or +D1 assumes a negative state. In the case of detection period 40, −CD at 120 activates latch 1 to go positive at 121. This means +D1 goes negative at 122; i.e., +D has been detected in detection period 40. In a similar manner, by examining the action-indicating lines in FIG. 3, other signal states corresponding to input data and the timing of VFC 14 signals can be traced for showing the variation of −D1, +D1, −D2, and +D2 output signals from the two detecting latches.

A detector latch, such as that employed in the present application, is first described by Gene Clapper in the IBM TECHNICAL DISCLOSURE BULLETIN, February 1964, on Page 69. The present comparison circuit provides some improvement in operation over that described latch.

As mentioned earlier, the detecting latches also act as digital memory circuits in the detection circuits; that is, once transistors 111 and 112 are activated by transistor 117 becoming current conductive, that signal state is maintained irrespective of the signal variations from first demodulator output circuit 20. Examining FIG. 3, it is seen that −CD remains positive for the duration of detection period 71, which is the squelch period for the first integrator and a detection period for the second integrator. −C delayed signal becomes positive during the middle of period 71 and remains positive until the middle of period 42 immediately following a detection period. During this time, latch current switching transistor 118 maintains the signal state of latch 111, 112 such that during period 42 its signal contents can be compared with the signal contents of the second detecting latch 23, as will be described in more detail with respect to the decoding of the NRZI detected signals. Examination of the latch 1 and latch 2 signals in FIG. 3 shows that each is activated for 1 ½ detection periods such that there is an overlap for enabling NRZI conversion. In the event only NRZ input signals were being detected, the latches could be maintained for one bit period, no history of signal polarity being needed for NRZ. For an NRZI input signal and NRZ output signal, set-reset latch 32 receives the NRZI decode signals.

Referring back now to FIG. 1, the output signals of the first and second detecting latches 22 and 23 drive the NRZI decode AO's 24 and 25. NRZI 1 is represented by a change in signal polarity. To this end, the +D1 and −D2 signals drive the A1 portion of AO 24 to indicate an NRZI 1; while the −D1 and +D2 output signals drive the A2 portion to indicate an opposite change in signal polarity for an NRZI 1. In a similar manner, like polarity output signals +D1 and +D2, and −D1 and −D2, respectively drive the two AND input portions of AO 25 for indicating NRZI 0's, i.e., no change in readback signal polarity. Such signal detection is illustrated in FIG. 3 by the action line 130 tieing −D2 to +D1 to indicate a binary 1 output pulse; while a binary 0 is indicated by action line 131 tieing +D2 with +D1 to indicate an NRZI 0. The 1's and 0's are combined to generate the NRZI output signal in trigger 30. NRZ output signal from an NRZ input signal is generated by the OR's 26 and 27, as can be determined by examination of FIG. 1. An NRZ output signal from an NRZI input signal is supplied via set-reset latch 32.

Figure 6:
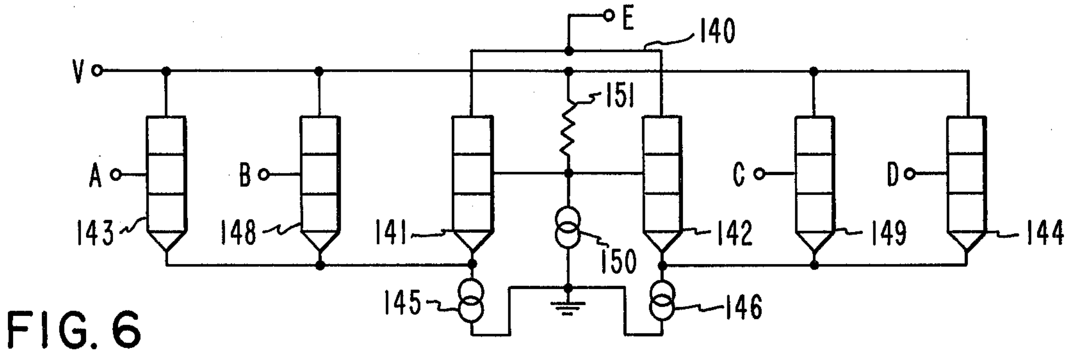
FIG. 6 is an abbreviated circuit diagram of a decoder circuit element.

Since it is desired that all of the circuitry be in monolithic or integrated semi-conductive circuit form, the NRZI decode AO's 24 and 25 take the form of current switches, as shown in FIG. 6. First, an OR circuit will be described. An output signal at terminal E is defined as a current flow for an active output and lack of current flow for no active output signal. The OR function is the common collector connection 140 between output transistors 141 and 142. A first input A to transistor 143 is OR'd via output transistor 141 with input D at transistor 144 and supplied to node 140 via transistor 142 (assume transistors 142 and 148 are not in the circuit). That is, if the input at A is positive, current flows through transistor element 143 to source 145. As a result, transistor 141 becomes current nonconductive, resulting in no current flow at 140. This indicates no input; however, if terminal A becomes negative, then current flows through transistor 141 to source 145. In a similar manner, when the input at D makes transistor 144 current nonconductive, current flows through transistor element 142 to source 146. Hence, either transistor 143 or 144 becoming current nonconductive causes current to flow through node 140, hence, a logic OR output at E.

The AND function in the FIG. 6 illustrated circuit element is constituted on each wing of the circuit by transistors 143 and 148 for inputs A and B and transistors 144 and 149 for inputs C and D. Both transistors 143 and 148 must be current conductive before transistor 141 becomes current conductive, hence, provides an output. This is a coincidence AND function. In a similar manner, transistor elements 144 and 149 coact with transistor element 142 to provide an AND function CD. Current source 150 provides a reference potential to output transistors 141 and 142 via reference resistor 151.

Referring next to FIG. 7, a phase error circuit 28 is described. Phase shift reference from the alternate cycle integrators of FIG. 2 is received at 160 from transistor 82. The phase error reference is adjustable by potentiometer 161 to provide a variable reference for phase error thresholds at the base electrode of transistor 162. Transistor 162, in turn, is emitter-follower coupled to the base electrode of the reference comparing transistor element 163 of the differential trio transistors 164. Current sources 165, for the various portions of the phase error circuit, are preferably matched; i.e., constructed in the same portion of the monolithic chip. Differential trio transistor elements share a common current source 166 through current switching transistor 167. The two input transistors 170 and 171 receive signals from the integration capacitors as indicated. These input transistor elements are emitter coupled to current sources 165 to drive the base electrodes of the two transistor elements 172 and 173 of the differential trio. If both transistors 172 and 173 have a total current summation, as summed at the common collector connection 174, which is less than the reference current flowing through transistor 163, then compare circuit 175 supplies a phase error indicating signal. Note that if only one transistor 173 is highly current conductive, then the current magnitude to 163 is less; hence, no phase error. However, if both transistors 172 and 173 are current nonconductive, the current flow at 174 is small. Current source 162A tracks current source 56 of FIG. 2 so that the phase shift (error) threshold remains constant with respect to the squelch reference on line 86 regardless of expected current source 56 variations. Hence, the current through 163 will be greater, indicating the phase error. Compare circuit 175 is degated by a 2C signal (a signal having twice the pulse repetitive frequency of +C signal) such that the phase compare occurs at each strobe time. +2C has a slight phase delay from +C such that phase shift strobes after completion of each detection period. Operation of the switching transistors 167 and 180 is as previously described. Circuit 28 responds to a phase error or noise as indicated by the dashed lines adjacent integration 41 (+D+C) and ACI 1 of FIG. 3. If ACI 1 amplitude is less than the pointer zone dashed line indicated amplitudes, circuit 28 indicates a phase error. Similar operation is taught by M. R. Cannon in the IBM TECHNICAL DISCLOSURE BULLETIN, September 1971, at Page 1171.

While the invention has been particularly shown and described with reference to a preferred embodiment thereof, it will be understood by those skilled in the art that various changes in form and detail may be made therein without departing from the spirit and scope of the invention

What is claimed is:

1. A signal processing apparatus having means for receiving input signals to be synchronously detected, clock means responsive to said input signals to generate first and second alternating timing signals for synchronous detection of such input signals, the improvement including in combination:

a first signal processing channel receiving said input signals and responsive to said first timing signals to synchronously process said input signals during successive first time periods;

a second signal processing channel receiving said input signals and responsive to said second timing signals to synchronously process said input signals during successive second time periods which alternate with said first time periods;

each said signal processing channel respectively including first and second synchronous demodulator circuits, first and second demodulator output circuits responsive, respectively, to said synchronous demodulator circuits to digitally indicate synchronously demodulated signals, and first and second digital memory circuits responsive to said demodulator output circuits, respectively, to memorize said indicated synchronously demodulated signals;

each said circuit in said first and second channels receiving said first and second timing signals, respectively, for enabling alternate synchronous circuit operation in said channels; and data output circuit means responsive to both said digital memory circuits for indicating informational content of said input signals.

2. The apparatus set forth in claim 1 wherein each said synchronous demodulator circuit includes analog memory means for storing synchronously demodulated signals;

means in each said synchronous demodulator circuit responsive to said first and second timing signals, respectively, to actuate said respective synchronous demodulator circuits to store said synchronously demodulated signals for a period of time extending into a next-occurring time period;

said demodulator output circuits respectively responsive to said first and second signals to sample said synchronously demodulated signals during said periods of time, respectively; and said clock means supplying others of said first and second timing signals to become active during said periods of time, respectively, for actuating said digital memory circuits to memorize said digital indicating signals, respectively.

3. The apparatus set forth in claim 2 further including an integrator circuit in each said synchronous demodulator circuit, each said integrator circuit supplying signals to be integrated, respectively, to said analog memory means; and squelch means in each said synchronous demodulator circuit to squelch the respective analog memory means upon cessation of the respective ones of said periods of time.

4. The apparatus set forth in claim 3 further including in combination:

an integrator current sink;

means responsive to said timing signals to switch said integrator current sink between said integrator circuits in said first and second synchronous demodulator circuits for integrating an input signal by discharging said analog memory means in accordance with said input signal, respectively;

a squelch current sink connected to both said squelch means for receiving electrical current therefrom; and an intermediate current source connected to said squelch current sink to supply current thereto during each said periods of time.

5. The apparatus set forth in claim 4 further including squelch reference means;

each said squelch means including a current source switch transistor element connected to said squelch reference means for establishing a common squelch potential in all said analog memory means;

each said squelch means further including a current sink switch transistor element connecting said squelch current sink to respective ones of said analog memory means; and delay means in each said squelch means including a transistor element receiving respective ones of said timing signals and delay simultaneous application thereof to said switch transistor elements in the respective squelch means for establishing said periods of time.

6. The apparatus set forth in claim 1 further including in combination:

a pulse former receiving said input signals to supply +D and −D data pulses to said first and second signal processing channels;

each said synchronous demodulator circuit including two demodulating portions, respectively, for said +D and −C data pulses to respectively supply +D+C, −D+C, and +D−C, −D−C synchronously demodulated signals in said first and second signal processing channels; and said demodulator output circuits including a switching compare circuit responsive, respectively, to said +D+C, −D+C and +D−C, −D−C synchronously demodulated signals to supply a binary signal indicating a given analog signal relationship between said +D+C with −D+C and +D−C with −D−C synchronously demodulated signals, respectively.

* * * * *